US010957028B2

(12) United States Patent
Shibata et al.

(10) Patent No.: US 10,957,028 B2
(45) Date of Patent: Mar. 23, 2021

(54) IMAGE GENERATION DEVICE, IMAGE GENERATION METHOD AND RECORDING MEDIUM

(71) Applicant: Panasonic Intellectual Property Management Co., Ltd., Osaka (JP)

(72) Inventors: Osamu Shibata, Hyogo (JP); Hiroshi Iwai, Osaka (JP); Kazuko Nishimura, Kyoto (JP); Yasuo Miyake, Osaka (JP); Yoshiaki Satou, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 129 days.

(21) Appl. No.: 16/331,629

(22) PCT Filed: Sep. 12, 2017

(86) PCT No.: PCT/JP2017/032767
§ 371 (c)(1),
(2) Date: Mar. 8, 2019

(87) PCT Pub. No.: WO2018/061739
PCT Pub. Date: Apr. 5, 2018

(65) Prior Publication Data
US 2019/0362479 A1    Nov. 28, 2019

(30) Foreign Application Priority Data
Sep. 30, 2016    (JP) .............................. JP2016-193050

(51) Int. Cl.
*G06T 5/50*    (2006.01)

(52) U.S. Cl.
CPC .......... *G06T 5/50* (2013.01); *B60R 2300/101* (2013.01); *B60R 2300/105* (2013.01); *B60R 2300/302* (2013.01); *B60R 2300/303* (2013.01)

(58) Field of Classification Search
None
See application file for complete search history.

(56) References Cited

U.S. PATENT DOCUMENTS 6,972,796 B2 * 12/2005 Katta ................. H04N 5/23238
                                                    348/333.01
2007/0222877 A1    9/2007 Kurane

FOREIGN PATENT DOCUMENTS

CN         101047786 A    10/2007
JP         2003-018559    1/2003
(Continued)

OTHER PUBLICATIONS

International Search Report of PCT application No. PCT/JP2017/032767 dated Oct. 31, 2017.
(Continued)

*Primary Examiner* — Leon Flores
(74) *Attorney, Agent, or Firm* — Greenblum & Bernstein, P.L.C.

(57) ABSTRACT

An image generation device includes a first reception unit and a control unit. The first reception unit receives travel information about the travel state of a moving body. The control unit sets, based on the travel information, a multiple-exposure region in an imaging region of an image sensor used on the moving body, and generates image data in which the multiple-exposure region in the imaging region is formed through a multiple exposure and a region other than the multiple-exposure region is not formed through the multiple exposure.

17 Claims, 11 Drawing Sheets

(56) References Cited

FOREIGN PATENT DOCUMENTS

| | | |
|---|---|---|
| JP | 2007-081553 | 3/2007 |
| JP | 2013-041481 | 2/2013 |

OTHER PUBLICATIONS

Chinese Office Action dated Jul. 3, 2020 for the related Chinese Patent Application No. 201780059040.5.

* cited by examiner

FIG. 4

Compression level information

| Compression LV | Compression ratio | Number of pixels |
|---|---|---|
| 1 | 1 | 640x360 |
| 2 | 1/2 | 640x180, 320x360 |
| 3 | 1/4 | 320x180 |
| 4 | 1/4 | 640x90 |
| 5 | 1/8 | 320x90 | ns
IMAGE GENERATION DEVICE, IMAGE GENERATION METHOD AND RECORDING MEDIUM

CROSS-REFERENCE TO RELATED APPLICATIONS

This application is a U.S. national stage application of the PCT International Application No. PCT/JP2017/032767 filed on Sep. 12, 2017, which claims the benefit of foreign priority of Japanese patent application 2016-193050 filed on Sep. 30, 2016, the contents all of which are incorporated herein by reference.

TECHNICAL FIELD

The present disclosure relates to an image generation device, an image generation method, a program, and a recording medium.

BACKGROUND ART

A technique for detecting an object from image data captured by an in-vehicle camera and a technique for reducing the image data are known. The image processing device disclosed in Patent Literature (PTL) 1 includes an image obtainment unit, a region setting unit, and a processing unit. The image obtainment unit obtains infrared image data. For an image region based on the infrared image data obtained by the image obtainment unit, the region setting unit sets a boundary line for segmenting the image region into two or more regions, and sets, as a pixel density changing region, at least one of the two or more regions obtained by segmenting along the boundary line. The processing unit performs a process for reducing the pixel density of the infrared image data in the pixel density changing region, performs an object detection process on the basis of the infrared image data in the image region including the pixel density changing region, and generates image data for display on the basis of the result of the detection process.

CITATION LIST

Patent Literature

PTL 1: Unexamined Japanese Patent Publication No. 2013-041481

SUMMARY OF THE INVENTION

The present disclosure provides an image generation device, an image generation method, a program, and a recording medium for appropriately capturing an image of a high-speed moving object by a camera mounted on a moving body.

One embodiment of the present disclosure is directed to an image generation device including a first reception unit and a control unit. The first reception unit receives travel information about the travel state of a moving body. The control unit sets, based on the travel information, a multiple-exposure region in an imaging region of an image sensor used on the moving body, and generates image data in which the multiple-exposure region in the imaging region is formed through a multiple exposure and a region other than the multiple-exposure region is not formed through the multiple exposure.

The above one embodiment may be any of a method, a program, and a non-transitory, tangible recording medium having a program recorded thereon.

According to the present disclosure, it is possible to provide an image generation device, an image generation method, a program, and a recording medium for appropriately capturing an image of a high-speed moving object by a camera mounted on a moving body.

BRIEF DESCRIPTION OF DRAWINGS

FIG. 4 is a diagram illustrating compression level information.

DESCRIPTION OF EMBODIMENTS

Prior to describing an exemplary embodiment of the present disclosure, problems in the related art are described briefly. A camera mounted on a moving body such as an in-vehicle camera has many opportunities to capture an image of a high-speed moving object. It is known that when the shutter speed is set high, an image of a high-speed moving object can be captured, but high-speed continuous shooting results in a large image data amount per unit time (or high frame rate).

Hereinafter, an exemplary embodiment will be described with reference to the drawings.

Note that in the case where elements of the same type are differentiated in the description, reference marks may be used like "segment 200L" and "segment 200R", whereas in the case where elements of the same type are not differentiated in the description, only the common number in reference marks may be used like "segment 200".

Furthermore, structural elements (including element steps and the like) in the following exemplary embodiment are not necessarily essential except as otherwise particularly noted or considered obviously essential in principle.

<Overall Configuration>

Figure 1:
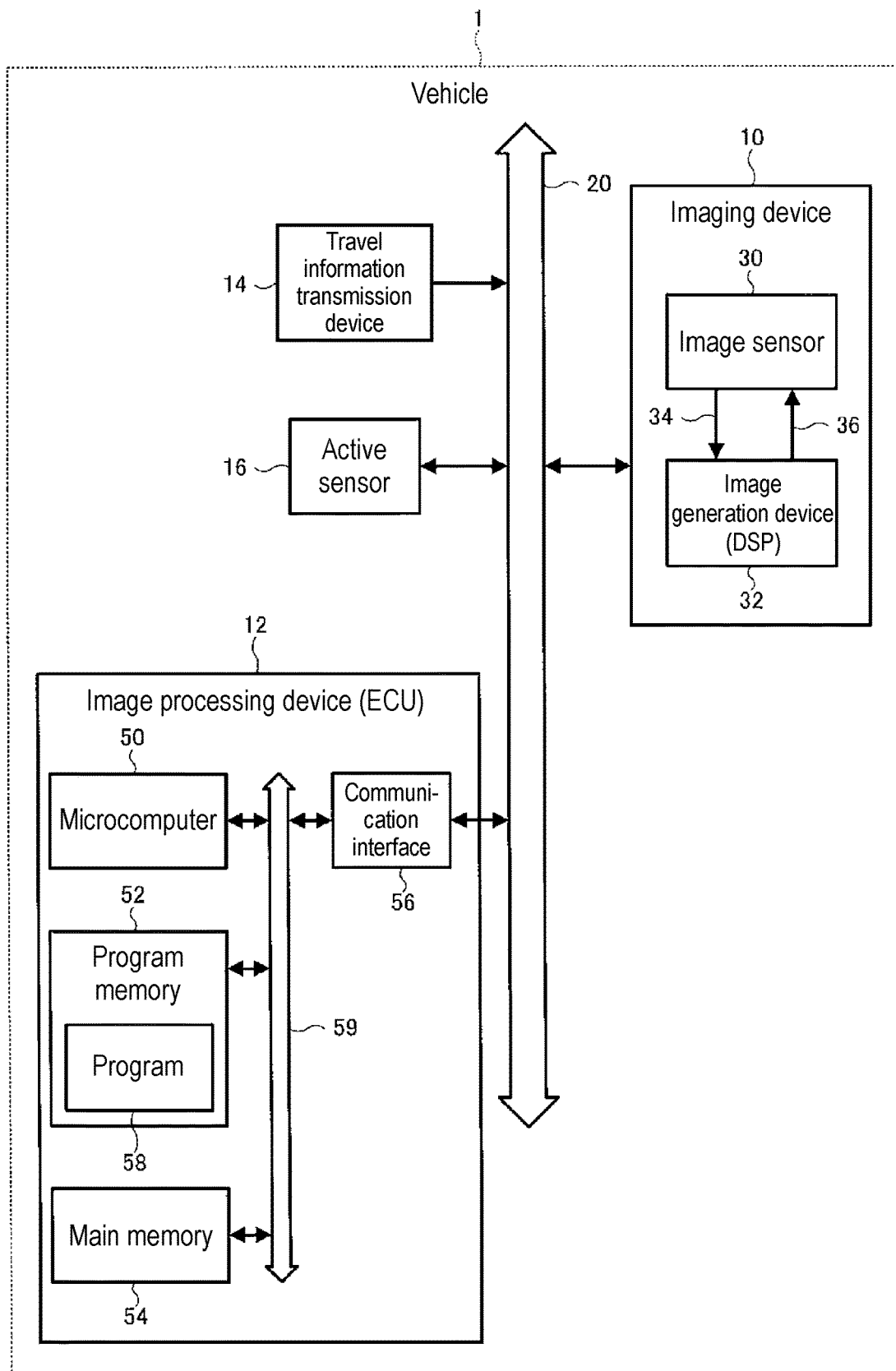
FIG. 1 is a diagram illustrating a configuration example of an image generation device and an image processing device according to the present disclosure.

FIG. 1 is a diagram illustrating a configuration example of an image generation device and an image processing device according to the present disclosure.

Imaging device 10 including image generation device 32 according to the present disclosure, electronic control unit (ECU) 12 which is an exemplary embodiment of image processing device 12 according to the present disclosure, travel information transmission device 14, and active sensor 16 are connected via network 20 to vehicle 1 which is an example of the moving body. Network 20 can be configured, for example, by combining a controller area network (CAN) used to mainly transmit control signals and media oriented systems transport (MOST) or intelligent transport systems (ITS) data bus-1394 (IDB-1394) used to mainly transmit signals about multimedia. Note that vehicle 1 does not necessarily need to include, but may include only some of, all devices 10, 12, 14, and 16. Furthermore, in the case of one-to-one connection, a low-voltage differential signaling (LVDS) serial interface or the like may be used for connection.

Imaging device 10 is mounted on vehicle 1 and captures an image around (typically ahead of) vehicle 1. Imaging device 10 includes: image sensor 30; and digital signal processor (DSP) 32 which is an exemplary embodiment of image generation device 32 according to the present disclosure. A pixel signal output from image sensor 30 is input to DSP 32 via predetermined transmission path 34. Note that in a typical case where image sensor 30 transmits an analog image signal to DSP 32, an analog-to-digital converter (AD) (not illustrated in the drawings) is usually disposed between image sensor 30 and DSP 32. DSP 32 may output a control signal to image sensor 30 via predetermined transmission path 36. Details of imaging device 10 will be described later (refer to FIG. 2).

Travel information transmission device 14 transmits travel information including information about the travel state of a moving body which is vehicle 1 or the like at a predetermined timing to imaging device 10 via network 20. A specific example of the travel information will be described later. Imaging device 10 determines a travel scene of the moving body such as vehicle 1 on the basis of the received travel information. Examples of the travel scene of the moving body such as vehicle 1 include traveling straight, steering right, steering left, turning right, turning left, having almost reached the top of an uphill, and having almost reached the bottom of a downhill Details of travel information transmission device 14 will be described later.

In order to sense information around vehicle 1, active sensor 16 emits millimeter waves, waves of laser light, or the like, and measures, for example, the distance between vehicle 1 and a nearby object based on return waves resulting from the waves being reflected by the object and returning to active sensor 16 itself.

ECU 12 controls each device connected to network 20. ECU 12 may include communication interface (I/F) 56, microcomputer 50, program memory 52, and main memory 54. Structural elements 50, 52, 54, and 56 may be capable of bidirectional communication via internal bus 59. In the case of one-to-one communication, unidirectional communication of information about image data is also applicable.

Communication interface 56 controls data transmission and reception via network 20.

Program memory 52 holds program 58. Program memory 52 may be a non-volatile semiconductor memory such as an electrically erasable programmable read-only memory (EEPROM).

Main memory 54 stores various data regarding execution of program 58. Main memory 54 may be a volatile semiconductor memory such as a static random-access memory (SRAM) and a dynamic random-access memory (DRAM).

Microcomputer 50 implements various functions of ECU 12 by reading program 58 from program memory 52 and executing program 58 using main memory 54. Microcomputer 50 may be capable of transmitting and receiving data to and from other devices 10, 14, and 16 via communication interface 56 and network 20.

<Functional Configuration of Image Generation Device>

Figure 2:
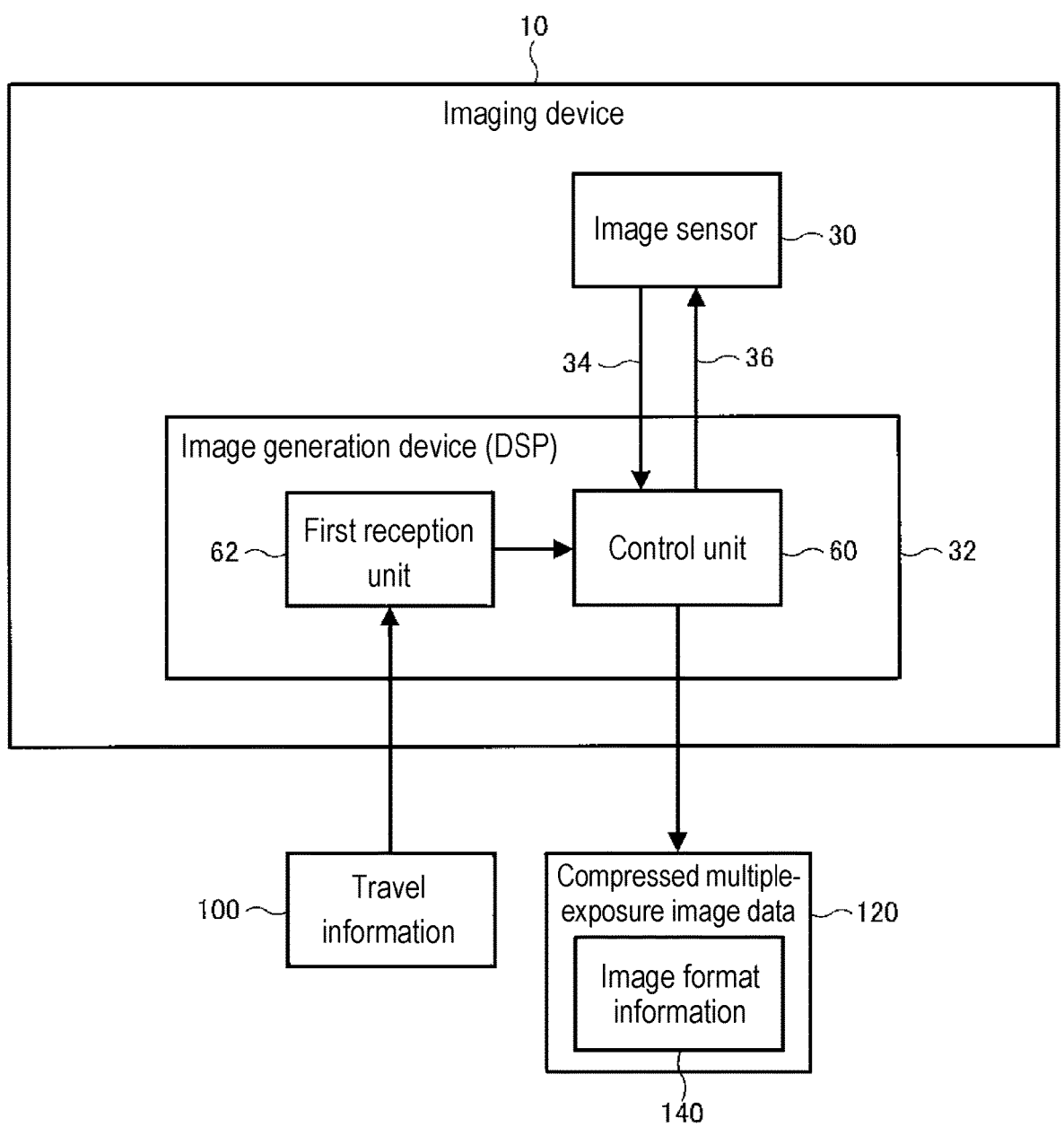
FIG. 2 is a diagram illustrating function blocks of an image generation device included in an imaging device.

FIG. 2 is a diagram illustrating function blocks of the image generation device included in imaging device 10.

Image sensor 30 in which a plurality of pixels 90 (refer to FIG. 3) each including a photoelectric conversion element are arranged sequentially outputs signals obtained by photoelectrically converting light incident on pixels 90. Image sensor 30 is, for example, a complementary metal oxide semiconductor (CMOS) image sensor or a charge-coupled device (CCD) image sensor. A signal output by image sensor 30 may be analog or may be digital. The unit of a single pixel may have a single black and white BW pixel configuration or may have a single color RGB pixel configuration, for example.

DSP 32 is an exemplary embodiment of the image generation device; DSP 32 according to the present disclosure includes first reception unit 62 and control unit 60 as functions. The functions of each of first reception unit 62 and control unit 60 may be provided as a logic circuit such as a field-programmable gate array (FPGA) and an application specific integrated circuit (ASIC) or may be provided as a program.

First reception unit 62 receives travel information 100 from travel information transmission device 14. Travel information 100 may be transmitted, as appropriate, by travel information transmission device 14 or may be obtained, as appropriate, by first reception unit 62 from travel information transmission device 14.

Control unit 60 controls signal read-out from each pixel of image sensor 30 and exposure of image sensor 30 based on travel information 100 received by first reception unit 62. A control signal may be transmitted from control unit 60 to image sensor 30 via transmission path 36, and a pixel signal may be transmitted from image sensor 30 to control unit 60 via transmission path 34. For example, control unit 60 sets, based on travel information 100, a multiple-exposure region in an imaging region of image sensor 30, and generates image data in which the multiple-exposure region in the imaging region is formed through a multiple exposure and a region other than the multiple-exposure region is not formed through the multiple exposure (referred to as "image data involving a multiple exposure"). At this time, control unit 60 may generate image data having a smaller number of pixels than the number of pixels of image data obtained when signals are read from all the pixels of image sensor 30 (more specifically, image data in which the resolution of a region other than a first partial region that is set based on travel information 100 is lower than the resolution of the first partial region). The generated image data is output to ECU 12 which is an exemplary embodiment of the image processing device, for example. Here, "setting" a multiple-exposure region means, for example, "selecting" or "determining" a portion of the entire region of the pixels of the image sensor, the imaging region, the image data, or the like.

Control unit 60 may skip reading, at a predetermined interval, signals of the pixels aligned on image sensor 30, to reduce the number of pixels of the image data to be output. Alternatively, control unit 60 may read signals from all the pixels of image sensor 30 and compress the obtained image using a predetermined image compression algorithm (for example, moving picture experts group (MPEG)), to reduce the number of pixels of the image data to be output. In either case, the number of pixels of the image data that DSP 32 outputs is smaller than the number of pixels of image data obtained when signals are read from all the pixels of image sensor 30.

Control unit 60 may generate image data involving a multiple exposure by reading signals from the pixels after more than one image capture at high shutter speed on the pixels in the multiple-exposure region (in this case, charge is accumulated in the pixels each time the shutter is opened or closed). Alternatively, control unit 60 may generate image data involving a multiple-exposure by superimposing plural pieces of image data resulting from image capture at high shutter speed. The image data involving a multiple-exposure includes captured image data corresponding to a trajectory of movement of a moving object. Note that the shutter may be a global shutter which receives light by all the pixels of image sensor 30 at the same timing (simultaneous exposure and collective reading for all the pixels). With this, image data with no distortion is generated.

With the above-described configuration, it is possible to appropriately capture an image of a moving object. Furthermore, it is also possible to reduce the amount of data transmission (or the data transmission rate) of image data between imaging device 10 and ECU 12. Note that image data having a reduced number of pixels which is to be output from DSP 32 and includes a region resulting from shooting by way of a multiple exposure may be referred to as "compressed multiple-exposure image data 120".

Here, each of the pixels of image sensor 30 belongs to one of a plurality of segments, and control unit 60 may determine at least one of the plurality of segments as the multiple-exposure region based on travel information 100 received by first reception unit 62. Hereinafter, the relationship between image sensor 30 and segments 200 will be described with reference to FIG. 3 and FIG. 4.

Figure 3:
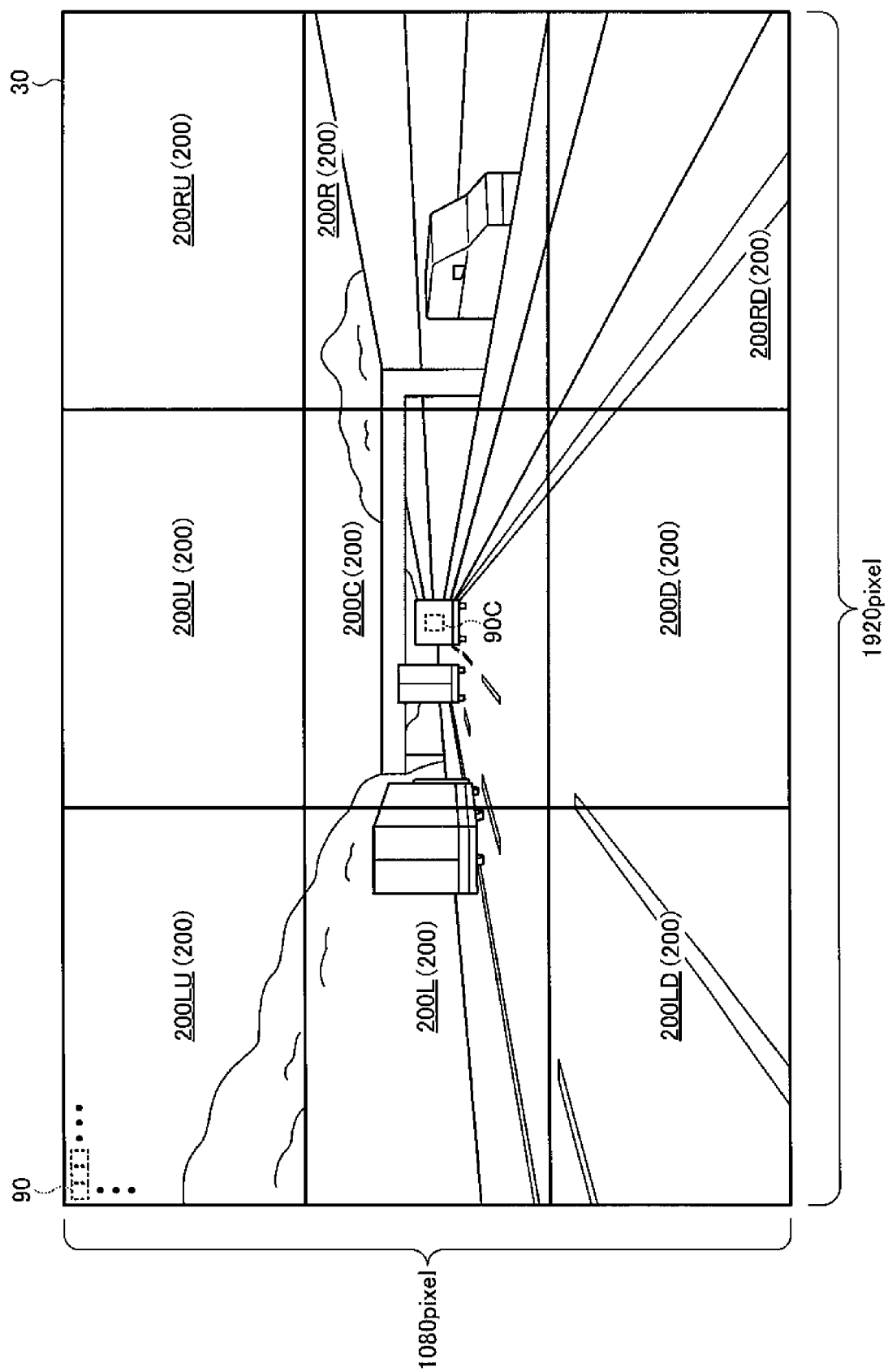
FIG. 3 is a diagram schematically illustrating segments configured for an image sensor.

FIG. 3 is a diagram illustrating segments 200 configured for image sensor 30.

FIG. 3 illustrates an example in which image sensor 30 including an array of pixels 90 that are 1920 pixels wide by 1080 pixels high (approximately 2,070,000 pixels), which corresponds to full high definition (HD), is divided into nine segments 200 by horizontally and vertically dividing the pixels into three equal portions. In this case, each segment 200 before compression is made up of 640 pixels wide by 360 pixels high (approximately 230,000 pixels). Note that although the resolutions (the numbers of pixels per unit length) of segments 200 before compression are the same in the present disclosure, the segments before compression may be made up of different numbers of pixels. For example, image sensor 30 may be divided in such a manner that the number of pixels in the segment at the center in FIG. 3 is greater than the number of pixels in another segment.

Control unit 60 may determine, as the multiple-exposure region, a segment including a pixel that receives light from the side with respect to a traveling direction of vehicle 1. The light received from the side with respect to the traveling direction of vehicle 1 may be light received from the vicinity of a travel path of vehicle 1. The vicinity of the travel path may include at least a traffic lane (such as a passing lane, a climbing lane, and oncoming lane) adjacent to a traffic lane in which host vehicle 1 is traveling. This is because it is more likely that an image of a moving object is captured in a passing lane, an oncoming line, or the like; thus, imaging by way of a multiple exposure is preferable. In the case of an example in FIG. 3, the vicinity of the travel path may include left segment 200L, right segment 200R, lower left segment 200LD, and lower right segment 200RD.

FIG. 4 is a diagram illustrating compression level information. A compression level possible for each segment 200 may be defined as the compression level information, as illustrated in FIG. 4. The compression level (compression LV) may be a compression ratio, may be the number of pixels, or may be the resolution of compressed data. Hereinafter, the compression level information in FIG. 4 will be described.

The number of pixels (in other words, the resolution) in a segment for which the compression level is determined as "1" is maintained (no compression is applied). In the example in FIG. 3, the resolution of a segment after compression is 640 pixels wide by 360 pixels high (approximately 230,000 pixels, which corresponds to "full HD").

The number of pixels (in other words, the resolution) in a segment for which the compression level is determined as "2" is reduced (compressed) by half. In the example in FIG. 3, the resolution of a segment after compression is 640 pixels wide by 180 pixels high or 320 pixels wide by 360 pixels high (approximately 115,000 pixels, which corresponds to "HD").

The number of pixels in a segment for which the compression level is determined as "3" is reduced (compressed) by one-fourth. In the example in FIG. 3, the resolution of a segment after compression is 320 pixels wide by 180 pixels high (approximately 57,000 pixels, which corresponds to "HD −").

The number of pixels in a segment for which the compression level is determined as "4" is reduced (compressed) by one-fourth. In the example in FIG. 3, the resolution of a segment after compression is 640 pixels wide by 90 pixels high (approximately 57,000 pixels, which corresponds to "standard definition (SD) +").

The number of pixels in a segment for which the compression level is determined as "5" is reduced (compressed) by one-eighth. In the example in FIG. 3, the resolution of a segment after compression is 320 pixels wide by 90 pixels high (approximately 28,000 pixels, which corresponds to "SD").

<Process for Determining Compression Level of Each Segment Based on Travel Information>

Figure 5:
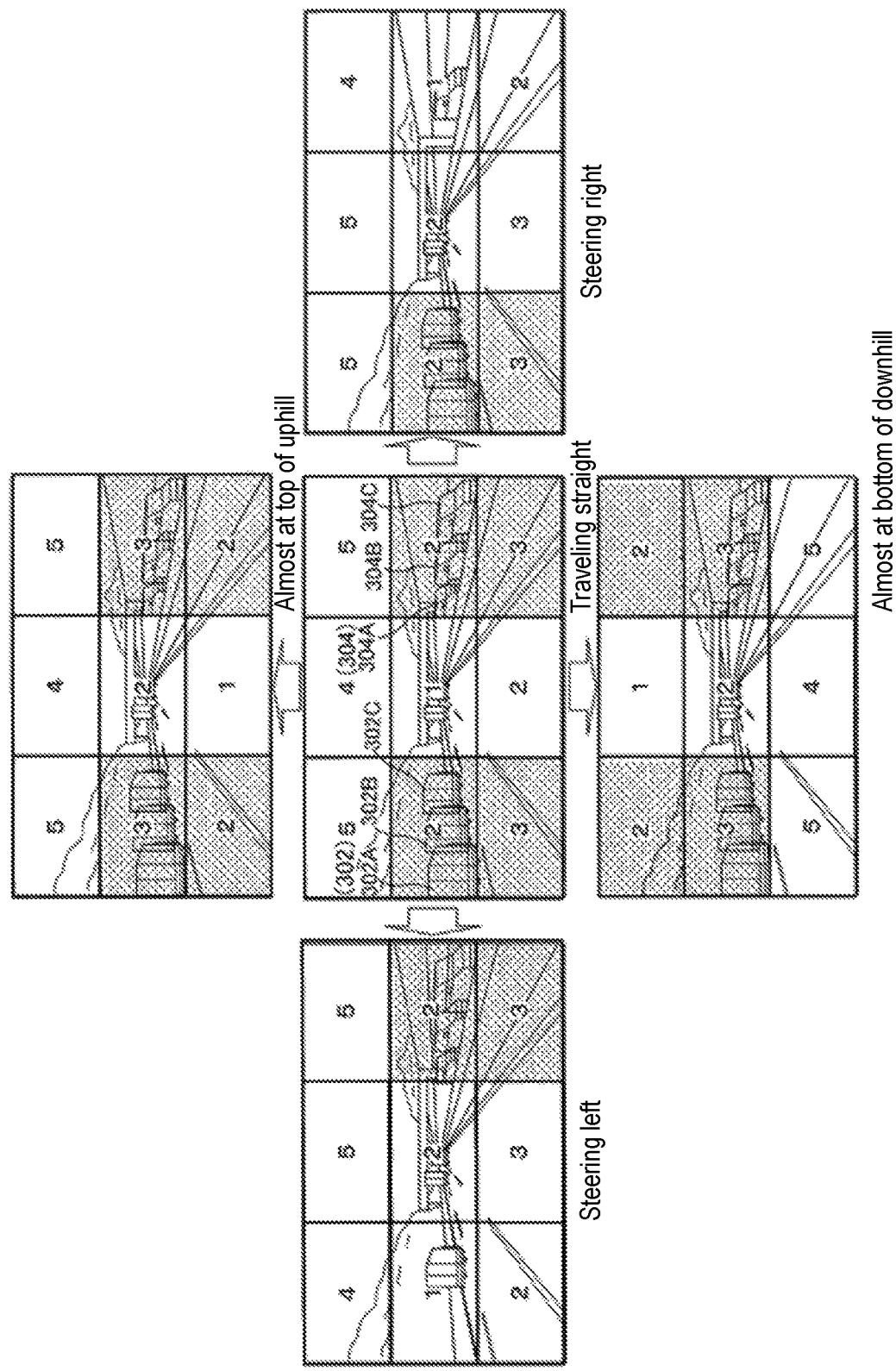
FIG. 5 is a diagram illustrating a compression level of each segment determined based on travel information.

FIG. 5 is a diagram illustrating the compression level of each segment 200 determined based on travel information 100.

Control unit 60 determines, based on travel information 100 received by first reception unit 62, which of "traveling straight", "steering right", "steering left", "almost at the top of an uphill", and "almost at the bottom of a downhill" the travel scene of vehicle 1 is.

Control unit 60 may determine, based on travel information 100 including a steering angle transmitted by a steering angle sensor which is an example of travel information transmission device 14, which of "traveling straight", "steering right", and "steering left" the travel scene of vehicle 1 is. The steering angle may be an angle of a steering wheel of vehicle 1. For example, when the steering angle is between 0 degree and a predetermined first angle in a right or left rotation direction, control unit 60 may determine the travel scene as "traveling straight". When the steering angle is greater than the first angle and less than or equal to a predetermined second angle in the right rotation direction, control unit 60 may determine the travel scene as "steering right", and when the steering angle is greater than the first angle and less than or equal to the second angle in the left rotation direction, control unit 60 may determine the travel scene as "steering left".

Control unit 60 may determine, based on travel information 100 including an angular velocity around a pitch axis transmitted by a gyro sensor which is an example of travel information transmission device 14, which of "almost at the top of an uphill" and "almost at the bottom of a downhill" the travel scene of vehicle 1 is or whether the travel scene of vehicle 1 is neither "almost at the top of an uphill" nor "almost at the bottom of a downhill" For example, control unit 60 may determine the travel scene as "almost at the top of an uphill" when the angular velocity around the pitch axis indicates the forward rotation for vehicle 1, and determine the travel scene as "almost at the bottom of a downhill" when the angular velocity around the pitch axis indicates the rearward rotation for vehicle 1.

Note that control unit 60 may determine the travel scene by another method. For example, control unit 60 may determine, based on travel information 100 including a slope angle ahead of a vehicle traveling spot transmitted by a navigation device which is an embodiment of travel information transmission device 14, which of "almost at the top of an uphill" and "almost at the bottom of a downhill" the travel scene of vehicle 1 is or whether the travel scene of vehicle 1 is neither "almost at the top of an uphill" nor "almost at the bottom of a downhill".

<When Determined as Traveling Straight>

When the travel scene is determined as traveling straight, control unit 60 sets, as the first partial region, segment 200 of image sensor 30 that includes a pixel receiving at least light from straight ahead. Furthermore, control unit 60 determines that the resolution of at least one segment 200 other than the first partial region is to be set lower than the resolution of the first partial region while maintaining the resolution of segment 200 serving as the first partial region. In other words, control unit 60 may determine the compression ratio of each segment so that the compression ratio (which is, for example, the compression level; the same applies hereinafter) of segment 200 serving as the first partial region becomes lowest. This is because it is preferable that an object in front of vehicle 1 be accurately detected in a short time while traveling straight.

For example, as illustrated at the center of FIG. 5, control unit 60 may determine that the compression level "1" is to be applied to center segment 200C serving as the first partial region. In addition, control unit 60 may determine that the compression level "2" is to be applied to left segment 200L, right segment 200R, and lower segment 200D, which are different from the first partial region. Furthermore, control unit 60 may determine that the compression level "3" is to be applied to lower left segment 200LD and lower right segment 200RD. Moreover, control unit 60 may determine that the compression level "4" is to be applied to upper segment 200U. Furthermore, control unit 60 may determine that the compression level "5" is to be applied to upper left segment 200LU and upper right segment 200RU. The reason why the compression levels of upper left segment 200LU and upper right segment 200RU are set high (in other words, the number of pixels thereof are set small) is that while traveling straight, images of the sky, the ceiling of a tunnel, and the like are mostly captured in segments 200LU and 200RU, meaning that the level of significance in detecting an object in segments 200LU and 200RU is low.

Furthermore, when the travel scene is determined as traveling straight, control unit 60 may exclude, from the segment to be determined as the multiple-exposure region, a segment including a pixel that receives at least light from straight ahead. For example, as illustrated at the center of FIG. 5, control unit 60 may exclude center segment 200C from the segment to be determined as the multiple-exposure region. In addition, control unit 60 may determine, as the segment serving as the multiple-exposure region, left segment 200L, right segment 200R, lower left segment 200LD, and lower right segment 200RD, which correspond to the vicinity of the travel path. As illustrated at the center of FIG. 5, left segment 200L serving as the multiple-exposure region includes captured image data (302A, 302B, and 302C) corresponding to a trajectory of movement of nearby vehicle 302 traveling in an adjacent traffic lane to the left. Right segment 200R serving as the multiple-exposure region includes captured image data (304A, 304B, and 304C) corresponding to a trajectory of movement of nearby vehicle 304 which is an example of a nearby moving body traveling in an oncoming lane. With this, it is possible to detect a nearby vehicle approaching at high speed from the left side and the right side of host vehicle 1 while host vehicle 1 travels straight. The reason why center segment 200C is not set as the multiple-exposure region, but is set to have a high resolution is that a nearby vehicle ahead is less likely to approach at high speed; thus, increasing the resolution is more preferable than increasing high-speed tracking capability in the image.

<When Determined as Steering Right>

When the travel scene is determined as steering right, control unit 60 sets, as the first partial region, at least one segment 200 including pixel 90 that receives light from a steering direction (the right side) of vehicle 1. Furthermore, control unit 60 determines that the resolution of at least one segment 200 other than the first partial region is to be set lower than the resolution of the first partial region while maintaining the resolution of segment 200 serving as the first partial region. In other words, control unit 60 may determine the compression ratio of each segment 200 so that the compression ratio of segment 200 serving as the first partial region becomes lowest. This is because it is preferable that an object on the right side in front of vehicle 1 be accurately detected in a short time while steering right.

For example, as illustrated on the right side in FIG. 5, control unit 60 may determine that the compression level "1" is to be applied to right segment 200R serving as the first partial region. In addition, control unit 60 may determine that the compression level "2" is to be applied to center segment 200C, lower right segment 200RD, and left segment 200L, which are different from the first partial region. Furthermore, control unit 60 may determine that the compression level "3" is to be applied to lower segment 200D and lower left segment 200LD. Moreover, control unit 60 may determine that the compression level "4" is to be applied to upper right segment 200RU. Furthermore, control unit 60 may determine that the compression level "5" is to be applied to upper segment 200U and upper left segment 200LU.

Furthermore, when the travel scene is determined as steering (right), control unit 60 may exclude, from the segment to be determined as the multiple-exposure region, a segment including a pixel that receives light from a steering direction (the right side in front) of the vehicle. For example, as illustrated on the right side in FIG. 5, control unit 60 may exclude right segment 200R from the segment to be determined as the multiple-exposure region. In addition, control unit 60 may determine left segment 200L and lower left segment 200LD as the segment serving as the multiple-exposure region. With this, it is possible to detect a nearby vehicle (such as a vehicle in an oncoming lane and a vehicle that suddenly appears) approaching at high speed from the left side in front of host vehicle 1 while host vehicle 1 steers right (or turns right).

<When Determined as Steering Left>

When the travel scene is determined as steering left, control unit 60 sets, as the first partial region, at least one segment 200 including pixel 90 that receives light from a steering direction (the left side) of vehicle 1. Furthermore, control unit 60 determines that the resolution of at least one segment 200 other than the first partial region is to be set lower than the resolution of the first partial region while maintaining the resolution of segment 200 serving as the first partial region. In other words, control unit 60 may determine the compression ratio of each segment 200 so that the compression ratio of segment 200 serving as the first partial region becomes lowest. This is because it is preferable that an object on the left side in front of vehicle 1 be accurately detected in a short time while steering left.

For example, as illustrated on the left side in FIG. 5, control unit 60 may determine that the compression level "1" is to be applied to left segment 200L serving as the first partial region. In addition, control unit 60 may determine that the compression level "2" is to be applied to center segment 200C, lower left segment 200LD, and right segment 200R, which are different from the first partial region. Furthermore, control unit 60 may determine that the compression level "3" is to be applied to lower segment 200D and lower right segment 200RD. Moreover, control unit 60 may determine that the compression level "4" is to be applied to upper left segment 200LU. Furthermore, control unit 60 may determine that the compression level "5" is to be applied to upper segment 200U and upper right segment 200RU.

Furthermore, when the travel scene is determined as steering (left), control unit 60 may exclude, from the segment to be determined as the multiple-exposure region, a segment including, among the plurality of pixels, a pixel that receives light from a steering direction (the left side in front) of the vehicle. For example, as illustrated on the left side in FIG. 5, control unit 60 may exclude left segment 200L from the segment to be determined as the multiple-exposure region. In addition, control unit 60 may determine right segment 200R and lower right segment 200RD as the segment serving as the multiple-exposure region. With this, it is possible to detect a nearby vehicle (such as a vehicle in an oncoming lane and a vehicle that suddenly appears) approaching at high speed from the right side in front of host vehicle 1 while host vehicle 1 steers left (or turns left).

<When Determined as Traveling Almost at Top of Uphill>

When the travel scene is determined as traveling almost at the top of an uphill, control unit 60 sets, as the first partial region, at least one segment 200 including pixel 90 that receives light at a downward angle with respect to a traveling direction of vehicle 1. Furthermore, control unit 60 determines that the resolution of at least one segment 200 other than the first partial region is to be set lower than the resolution of the first partial region while maintaining the resolution of segment 200 serving as the first partial region. In other words, control unit 60 may determine the compression ratio of each segment 200 so that the compression ratio of segment 200 serving as the first partial region becomes lowest. This is because it is preferable that an object at a downward angle with respect to the traveling direction of vehicle 1 be accurately detected in a short time while traveling almost at the top of an uphill.

For example, as illustrated on the upper side in FIG. 5, control unit 60 may determine that the compression level "1" is to be applied to lower segment 200D serving as the first partial region. In addition, control unit 60 may determine that the compression level "2" is to be applied to center segment 200C, lower left segment 200LD, and lower right segment 200RD, which are different from the first partial region. Furthermore, control unit 60 may determine that the compression level "3" is to be applied to left segment 200L and right segment 200R. Moreover, control unit 60 may determine that the compression level "4" is to be applied to upper segment 200U. Furthermore, control unit 60 may determine that the compression level "5" is to be applied to upper left segment 200LU and upper right segment 200RU.

Furthermore, when the travel scene is determined as traveling almost at the top of an uphill, control unit 60 may exclude, from the segment to be determined as the multiple-exposure region, a segment including a pixel that receives at least light from straight ahead. For example, as illustrated on the upper side in FIG. 5, control unit 60 may exclude upper segment 200U from the segment to be determined as the multiple-exposure region. In addition, control unit 60 may determine left segment 200L, right segment 200R, lower left segment 200LD, and lower right segment 200RD as the segment serving as the multiple-exposure region.

<When Determined as Traveling Almost at Bottom of Downhill>

When the travel scene is determined as traveling almost at the bottom of a downhill, control unit 60 sets, as the first partial region, at least one segment 200 including pixel 90 that receives light at an upward angle with respect to a traveling direction of vehicle 1. Furthermore, control unit 60 determines that the resolution of at least one segment 200 other than the first partial region is to be set lower than the resolution of the first partial region while maintaining the resolution of segment 200 serving as the first partial region. In other words, control unit 60 may determine the compression ratio of each segment 200 so that the compression ratio of segment 200 serving as the first partial region becomes lowest. This is because it is preferable that an object at an upward angle with respect to the traveling direction of vehicle 1 be accurately detected in a short time while traveling almost at the bottom of a downhill.

For example, as illustrated on the lower side in FIG. 5, control unit 60 may determine that the compression level "1" is to be applied to upper segment 200U serving as the first partial region. Furthermore, control unit 60 may determine that the compression level "2" is to be applied to center segment 200C, upper left segment 200LU, and upper right segment 200RU, which are different from the first partial region. Furthermore, control unit 60 may determine that the compression level "3" is to be applied to left segment 200L and right segment 200R. Moreover, control unit 60 may determine that the compression level "4" is to be applied to lower segment 200D. Furthermore, control unit 60 may determine that the compression level "5" is to be applied to lower left segment 200LD and lower right segment 200RD.

Furthermore, when the travel scene is determined as traveling almost at the bottom of a downhill, control unit 60 may exclude, from the segment to be determined as the multiple-exposure region, a segment including a pixel that receives at least light from straight ahead. For example, as illustrated on the lower side in FIG. 5, control unit 60 may exclude lower segment 200D from the segment to be determined as the multiple-exposure region. In addition, control unit 60 may determine left segment 200L, right segment 200R, upper left segment 200LU, and upper right segment 200RU as the segment serving as the multiple-exposure region.

As described above, control unit 60 reads signals from the pixels aligned on image sensor 30 to a built-in memory in accordance with the compression level of each segment determined by control unit 60 itself. Specifically, reading of pixels belonging to segment 200 which serves as the first partial region and to which the compression level "1" is applied is not skipped. Among the pixels belonging to segment 200 which does not serve as the first partial region and to which the compression level "2" is applied, one out of two pixels in one of the horizontal direction and the vertical direction is read. Among the pixels belonging to segments 200 which do not serve as the first partial region and to which the compression levels "3" and "4" are applied, one out of two pixels in both the horizontal direction and the vertical direction is read. Among the pixels belonging to segment 200 which does not serve as the first partial region and to which the compression level "5" is applied, one out of two pixels in one of the horizontal direction and the vertical direction is read, and one out of four pixels in the other direction is read. Pixel signals read in this method are read out to the memory of control unit 60, and thus compressed multiple-exposure image data is generated. This compressed multiple-exposure image data is transmitted from the memory to image processing device 12 via network 20 under control of control unit 60. Note that although the present exemplary embodiment describes a configuration in which the pixel signals are read out to the built-in memory, it is also possible to adopt a configuration in which pixel output of the image sensor is selected so that the compressed output is directly read out.

Note that control unit 60 may exclude a segment to be determined as the first partial region from the segment to be determined as the multiple-exposure region. In other words, control unit 60 may determine a segment serving as the multiple-exposure region from among segments which do not serve as the first partial region. This is because, although depending on the configuration of object detection unit 74 to be described later, the multiple exposure may impede accuracy improvement in detecting an object which is achieved by an increase in resolution.

Control unit 60 may superimpose, on a memory, image data in the segments serving as the multiple-exposure region so that the compressed multiple-exposure image data is generated in the memory. Therefore, in the compressed multiple-exposure image data, a segment other than the multiple-exposure region corresponds to an image captured by one shutter operation, and a segment serving as the multiple-exposure region corresponds to an image obtained by superimposing a plurality of images captured by two or more shutter operations. This compressed multiple-exposure image data is transmitted from the memory to image processing device 12 via network 20 under control of control unit 60.

Figure 6:
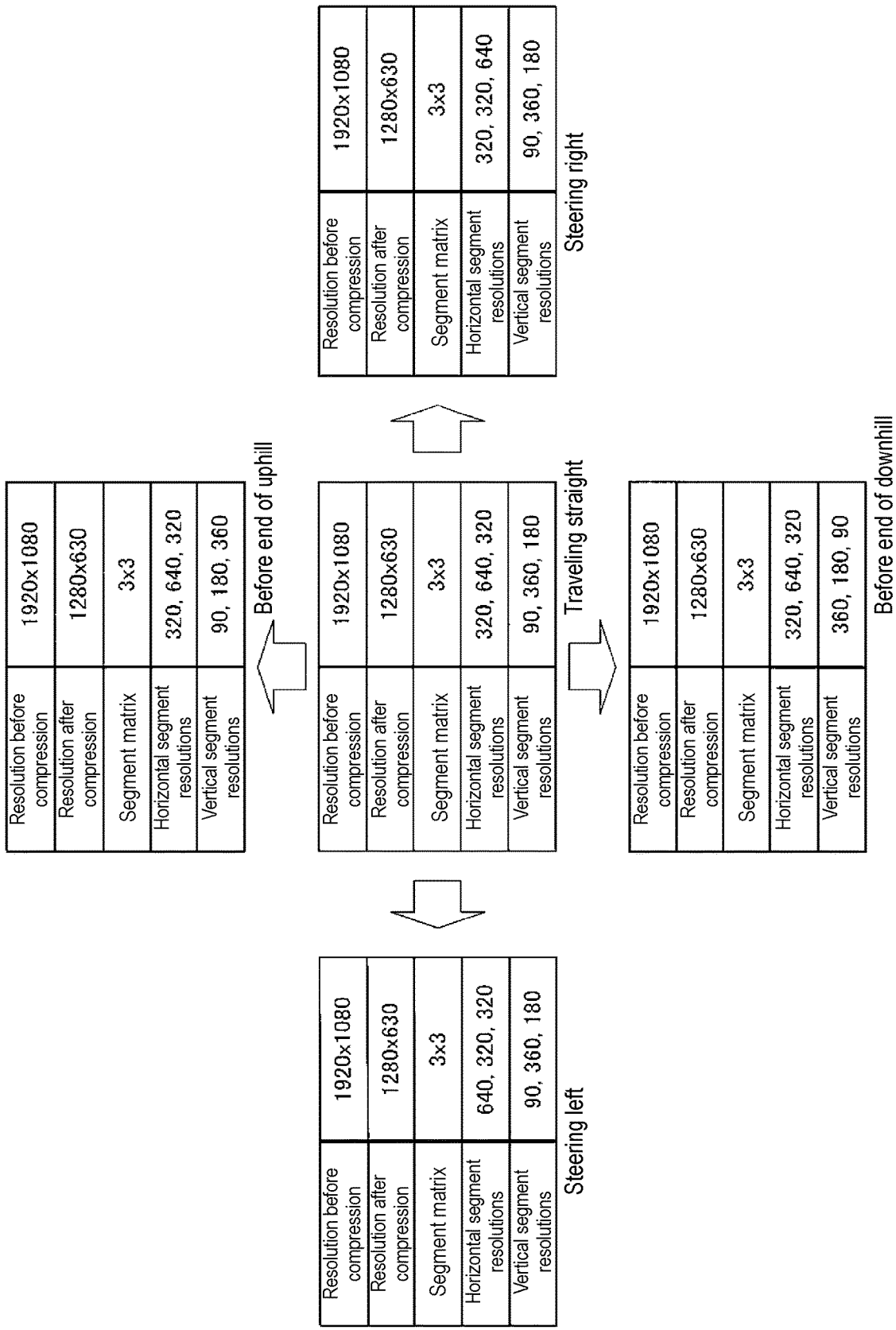
FIG. 6 is a diagram illustrating image format information determined based on travel information.

FIG. 6 is a diagram illustrating image format information determined based on the travel information.

At the time of outputting the compressed multiple-exposure image data, control unit 60 additionally outputs image format information including information about the resolution of each segment 200. Specifically, the image format information includes information required for an image processing unit which receives the output to properly decompress the compressed multiple-exposure image data. With this, ECU 12 which receives the output compressed multiple-exposure image data can generate one combined image data by appropriately combining the image data in segments 200 having different resolutions. Note that the image format information may be transmitted from DSP 32 in a blanking period (preferably in a vertical blanking period) of the output signal of the compressed multiple-exposure image data.

For example, as illustrated in FIG. 6, the image format information may include the total resolution of the uncompressed image data obtained from image sensor 30, the total resolution of the compressed image data, the number of segments in the vertical direction and the horizontal direction, and the horizontal and vertical resolutions of the segments.

The total resolution before compression represents the resolution (horizontal resolution×vertical resolution) of the uncompressed image data. In the case of FIG. 5, the resolution before compression is "1920 pixels wide by 1080 pixels high".

The total resolution after compression represents the resolution (horizontal resolution×vertical resolution) of the compressed image data. In the case of FIG. 5, the resolution of the compressed image data is "1280 pixels wide by 630 pixels high".

The number of segments in the vertical direction and the horizontal direction represents the matrix of segments 200 (the horizontal number of segments×the vertical number of segments). In the case of FIG. 5, the matrix of segments is "3×3".

The horizontal resolution represents the horizontal resolutions of the segments relative to the horizontal resolution after compression. In the case of FIG. 5, the horizontal resolution depends on the determination result of the travel information.

The vertical resolution represents the vertical resolutions of the segments relative to the vertical resolution after compression. In the case of FIG. 5, the vertical resolution depends on the determination result of the travel information.

<When Determined as Traveling Straight>

When the travel scene is determined as traveling straight, control unit 60 may set the horizontal resolutions of the segments to "320, 640, 320" in the left-to-right sequence, and the vertical resolutions of the segments to "90, 360, 180" in the downward sequence, as illustrated at the center in FIG. 6, for example.

<When Determined as Steering Right>

When the travel scene is determined as steering right, control unit 60 may set the horizontal resolutions of the segments to "320, 320, 640" in the left-to-right sequence, and the vertical resolutions of the segments to "90, 360, 180" in the downward sequence, as illustrated on the right side in FIG. 6, for example.

<When Determined as Steering Left>

When the travel scene is determined as steering left, control unit 60 may set the horizontal resolutions of the segments to "640, 320, 320" in the left-to-right sequence, and the vertical resolutions of the segments to "90, 360, 180" in the downward sequence, as illustrated in on the left side in FIG. 6, for example.

<When Determined as Traveling Almost at Top of Uphill>

When the travel scene is determined as traveling almost at the top of an uphill, control unit 60 may set the horizontal resolutions of the segments to "320, 640, 320" in the left-to-right sequence, and the vertical resolutions of the segments to "90, 180, 360" in the downward sequence, as illustrated on the upper side in FIG. 6, for example.

<When Determined as Traveling Almost at Bottom of Downhill>

When the travel scene is determined as traveling almost at the bottom of a downhill, control unit 60 may set the horizontal resolutions of the segments to "320, 640, 320" in the left-to-right sequence, and the vertical resolutions of the segments to "360, 180, 90" in the downward sequence, as illustrated on the lower side in FIG. 6, for example.

Note that control unit 60 may include, in the image format information, predetermination information that makes the segments serving as the multiple-exposure region identifiable.

<Other Travel States>

Control unit 60 may determine, based on travel information 100 including an indicated direction transmitted by a direction indicator which is an embodiment of travel information transmission device 14, whether the travel state of vehicle 1 is "turning right" or "turning left". When the travel scene is determined as turning right, control unit 60 may perform substantially the same process as the above-described process performed when the travel scene is determined as steering right. When the travel scene is determined as turning left, control unit 60 may perform substantially the same process as the above-described process performed when the travel scene is determined as steering left.

<Compression Level Determination Condition>

Control unit 60, which develops compressed multiple-exposure image data of a plurality of frames in the memory therein, may determine the compression ratio of each segment 200 so that the compressed multiple-exposure image data of these plurality of frames have the same total resolution. For example, control unit 60 may determine the compression ratio (or the horizontal and vertical resolutions) of each segment so that the resolutions of all the output compressed image frames after compression in the example in FIG. 6 become the same.

In all the travel states in FIG. 5, control unit 60 determines the compression level "1" for one segment 200, the compression level "2" for three segments 200, the compression level "3" for two segments 200, the compression level "4" for one segment 200, and the compression level "5" for two segments 200 among nine segments 200 regardless of a change in the travel scene. Specifically, control unit 60 determines the compression level of each image so that the total resolution of the output compressed image frame is 1280 pixels wide by 630 pixels high (approximately 810,000 pixels) at any point in time. This makes the data transmission rate for compressed image frames that are output from control unit 60 constant. Thus, it is possible to reduce the processing load or simplify the configuration on the image processing device (ECU 12) side where the compressed image frame is received and processed.

<Functional Configuration of Image Processing Device>

Figure 7:
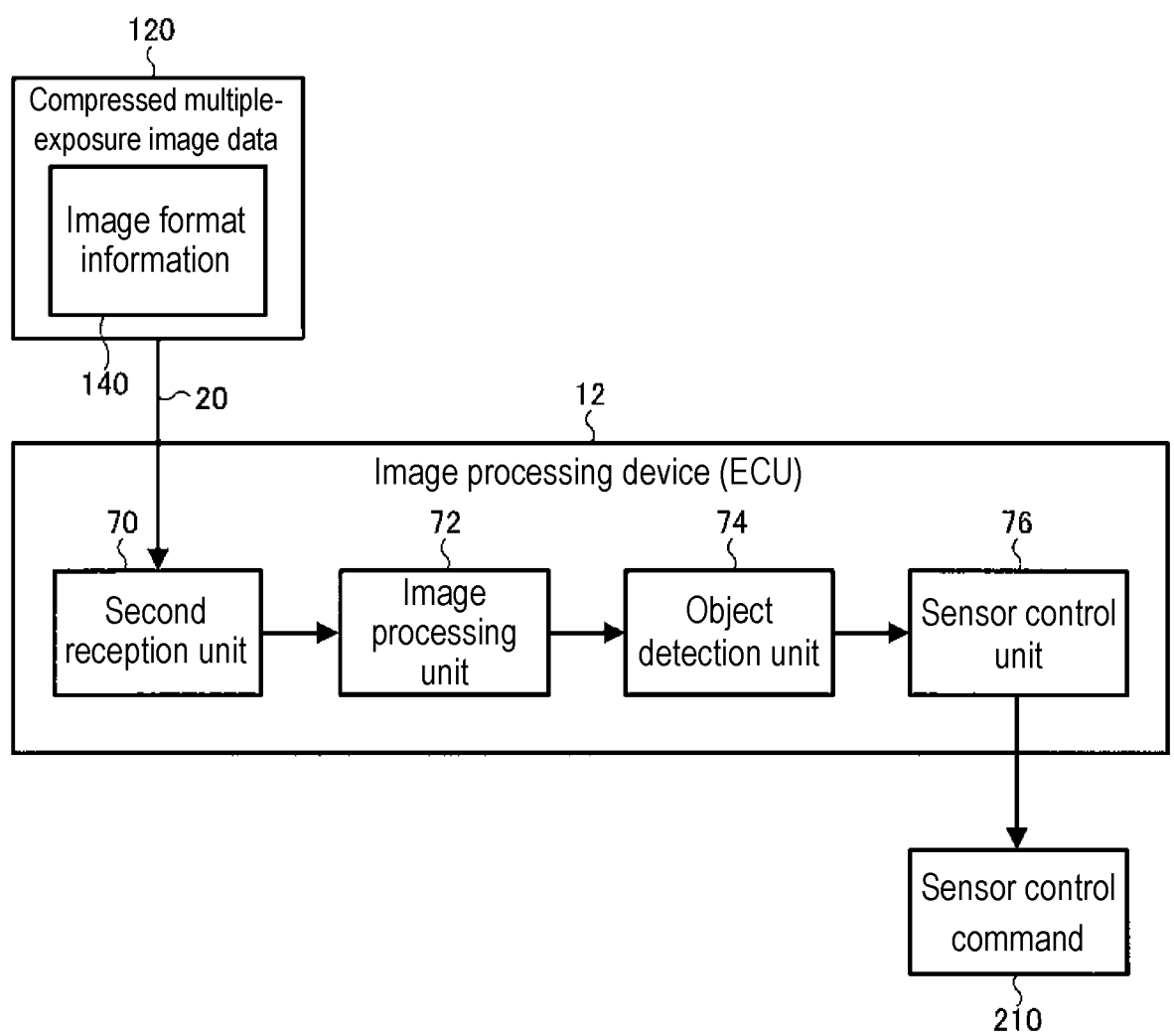
FIG. 7 is a diagram illustrating function blocks of an image processing device.

FIG. 7 is a diagram illustrating function blocks of the image processing device.

ECU 12 which is an example of the image processing device may include second reception unit 70, image processing unit 72, object detection unit 74, and sensor control unit 76 as functions.

<Second Reception Unit>

Second reception unit 70 receives, via network 20, compressed multiple-exposure image data 120 and image format information 140 in the memory included in DSP 32 in imaging device 10. Note that second reception unit 70 may directly receive compressed multiple-exposure image data 120 and image format information 140 from DSP 32, not via the memory. Furthermore, in the case where ECU 12 and DSP 32 are integrated, ECU 12 does not need to include second reception unit 70.

<Image Processing Unit>

Image processing unit 72 converts, based on image format information 140 received by second reception unit 70, the resolution of each segment 200 in compressed multiple-exposure image data 120 received by second reception unit 70.

For example, image processing unit 72 generates image data of 640 pixels wide by 360 pixels high, which is the same as the resolution of uncompressed segment 200, by doubling each of the horizontal and vertical resolutions of compressed segment 200 having a resolution of 320 pixels wide by 180 pixels high. For other compressed segments 200, image processing unit 72 likewise generates image data having a resolution of 640 pixels wide and 360 pixels high through substantially the same process. Furthermore, by combining the generated image data, image processing unit 72 generates combined image data having a resolution of 1920 pixels wide by 1080 pixels high which corresponds to the original full HD. Note that the process for increasing the resolution may be referred to as a "decompression process".

At the time of increasing the resolution (that is, increasing the number of pixels) of the compressed multiple-exposure image data, image processing unit 72 may complement the pixels using what is called the super-resolution technique.

<Object Detection Unit>

Object detection unit 74 detects a predetermined object, for example, through an edge extraction process, from the combined multiple-exposure image data generated by image processing unit 72. The predetermined object may be an object associated with the travel of vehicle 1 such as a nearby vehicle, a pedestrian, or a traffic sign, which is an example of a nearby moving body. Object detection unit 74 may detect an object from image data in a segment serving as the multiple-exposure region on the basis of an image pattern (for example, a trajectory pattern of a moving object) obtained by imaging the moving object through a multiple exposure.

The combined image data generated by image processing unit 72 has no image quality deterioration (uncompressed) or reduced image quality deterioration (lightly compressed) in segment 200 determined as relatively important based on travel information 100 through the process of control unit 60 in DSP 32. Thus, object detection unit 74 can accurately detect an object in a shorter time. For example, in the case of simply compressed image data, more than one combined image frame (that is, a long time) is required to detect an object; in contrast, in the case of the image data according to the present disclosure, relatively important segment 200 is high in image quality, and thus there is a higher likelihood that an object can be detected from one image frame.

Furthermore, in the combined image data generated by image processing unit 72, segment 200 in which an image of a moving object is likely to be captured based on travel information 100 is set to have a multiple-exposure image through the process of control unit 60 in DSP 32. Thus, object detection unit 74 can accurately detect a moving object in a shorter time. For example, in the case of simply compressed image data, more than one combined image frame (that is, a long time) is required to detect a moving object; in contrast, in the case of the image data according to the present disclosure, segment 200 in which the likelihood of an image of a moving object being captured is relatively high has a multiple-exposure image. Therefore, there is a high likelihood that a moving object can be detected from one image frame (that is, in a short time).

<Sensor Control Unit>

Figure 8:
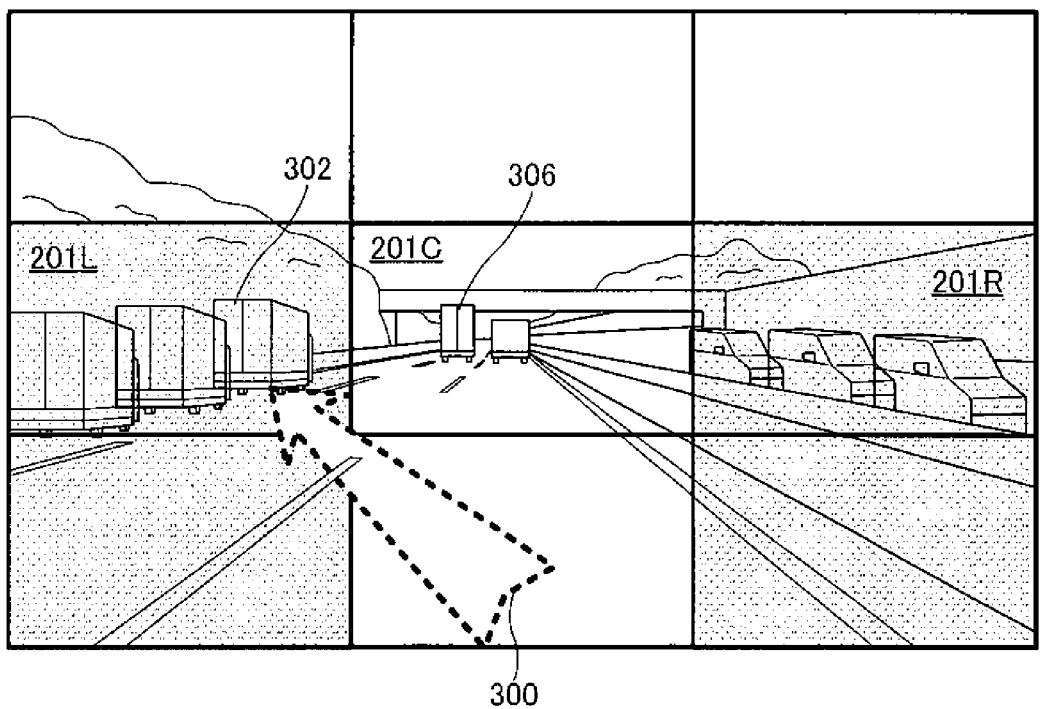
FIG. 8 is a diagram illustrating a change in a sensing method based on an object detection result.

FIG. 8 is a diagram illustrating a change in a sensing method based on an object detection result.

Sensor control unit 76 changes the sensing method for active sensor 16 according to the result of object detection by object detection unit 74. For example, sensor control unit 76 transmits sensor control command 210 for controlling active sensor 16 to active sensor 16 and changes the sensing method for active sensor 16. As described above, object detection unit 74 according to the present disclosure can accurately detect an object in a short time, and thus sensor control unit 76 can transmit appropriate sensor control command 210 with accuracy in a shorter time.

FIG. 8 shows an example of the combined image data in the case where active sensor 16 is a distance measurement sensor which emits millimeter waves 300 (which may be laser light) to measure the distance between host vehicle 1 and an object. In the combined image data in the example in FIG. 8, center segment 201C has a high resolution image, and left segment 201L has a multiple-exposure image. Object detection unit 74 detects, from the combined multiple-exposure image data, other vehicles 302 and 306, each of which is an example of a nearby moving body, in both of center segment 201C (that is, in front of host vehicle 1) and left segment 201L (that is, on the left side of host vehicle 1).

In sensor control unit 76, which of segment 201C having a high resolution and segment 201L serving as the multiple-exposure region is to be prioritized may be set. In the example in FIG. 8, when the settings indicate that segment 201C having a high resolution is to be prioritized, sensor control unit 76 may transmit, to active sensor 16, sensor control command 210 indicating that the direction in which millimeter waves 300 are emitted is to be changed to the front. With this, ECU 12 can accurately measure the distance between host vehicle 1 and nearby vehicle 306 in a shorter time. When the settings indicate that segment 201L serving as the multiple-exposure region is to be prioritized, sensor control unit 76 may transmit, to active sensor 16, sensor control command 210 indicating that the direction in which millimeter waves 300 are emitted is to be changed to the left. With this, ECU 12 can accurately measure the distance between host vehicle 1 and nearby vehicle 302 in a shorter time.

<Example of Application to Imaging Device Located on Side>

Figure 9:
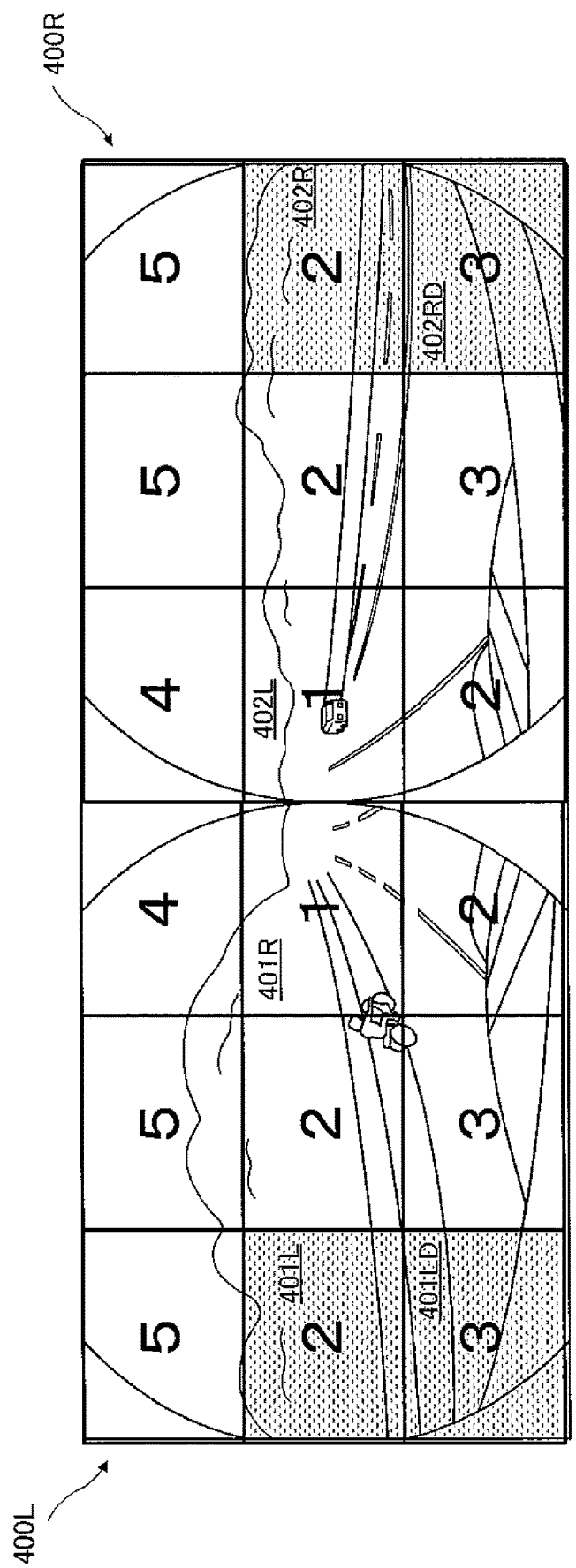
FIG. 9 is a diagram illustrating an example in which a multiple-exposure region is set for an imaging device located on the side.

FIG. 9 is a diagram illustrating an example in which the multiple-exposure region is set for an imaging device located on the side.

For image sensor 30 in imaging device 10 installed to capture an image of a side region in front of or behind vehicle 1, control unit 60 may exclude, from the segment to be determined as the multiple-exposure region, a segment in which an image of a region relatively distant from host vehicle 1 (for example, a region located at least a predetermined distance from host vehicle 1) is captured.

For example, FIG. 9 illustrates left image 400L captured of a rear region by imaging device 10 installed on the left side of vehicle 1 and right image 400R captured of a rear region by imaging device 10 installed on the right side of vehicle 1. In this case, for left image 400L, control unit 60 may exclude, from the segment to be determined as the multiple-exposure region, right segment 401R relatively distant from host vehicle 1, and set, as the multiple-exposure region, left segment 401L and lower left segment 401LD relatively close to host vehicle 1. Similarly, for right image 400R, control unit 60 may exclude, from the segment to be determined as the multiple-exposure region, left segment 402L relatively distant from host vehicle 1, and set, as the multiple-exposure region, right segment 402R and lower right segment 402RD relatively close to host vehicle 1.

<Example of Application to Surround-View Imaging Device>

Figure 10:
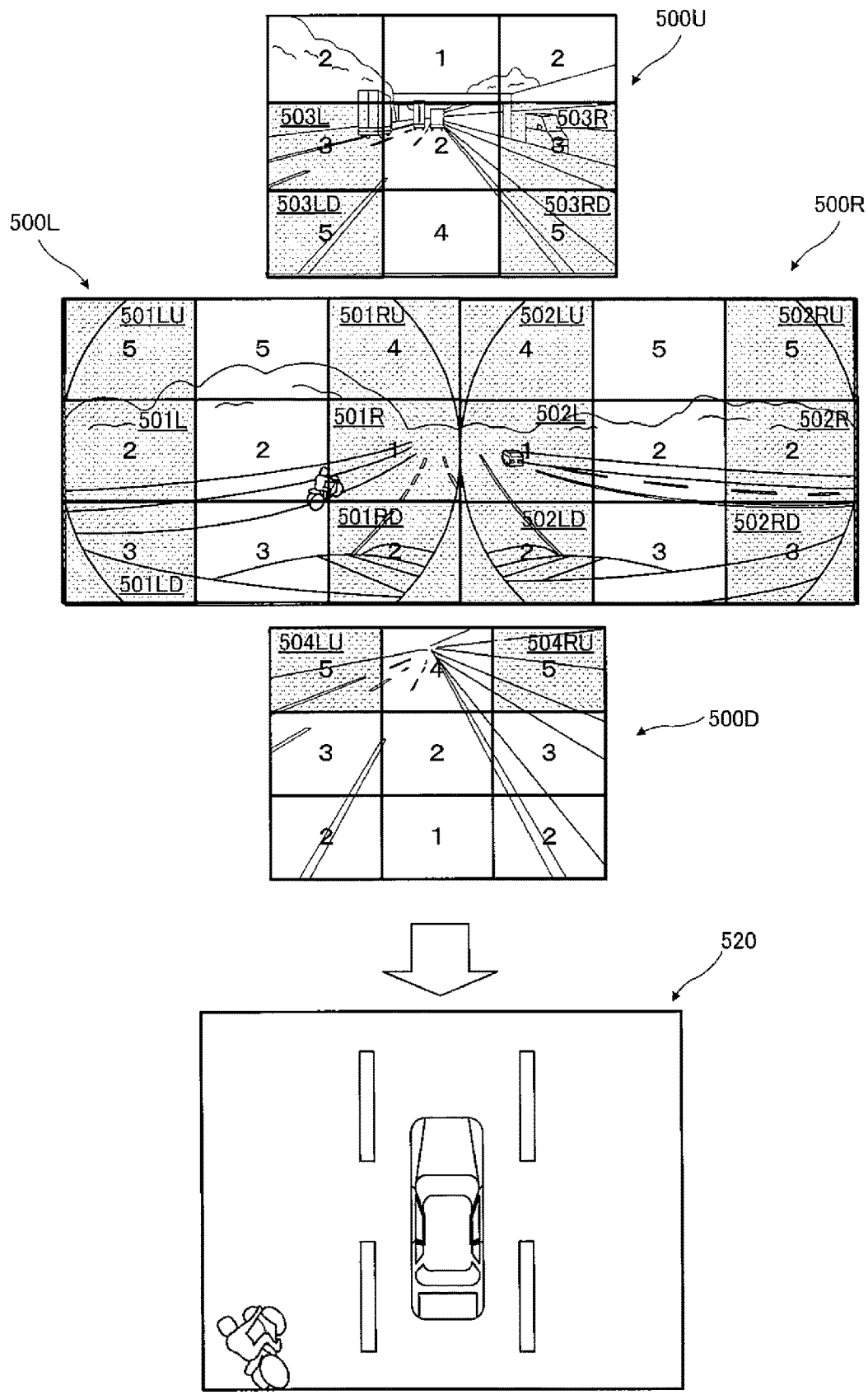
FIG. 10 is a diagram illustrating an example in which a multiple-exposure region is set for a surround-view camera.

FIG. 10 is a diagram illustrating an example in which the multiple-exposure region is set for a surround-view camera.

For image sensor 30 in each of a plurality of imaging devices 10 installed on vehicle 1 in such a manner as to be able to generate a surround-view image of vehicle 1, control unit 60 may determine a segment serving as the multiple-exposure region from segments in which an image of the surrounding area of host vehicle 1 is captured when a surround-view image is generated.

For example, FIG. 10 illustrates lower left image 500L captured of a lower left region by imaging device 10 installed on the left side of vehicle 1, lower right image 500R captured of a lower right region by imaging device 10 installed on the right side of vehicle 1, lower front image 500U captured of a lower front region by imaging device 10 installed on the front side of vehicle 1, and lower rear image 500D captured of a lower rear region by imaging device 10 installed on the rear side of vehicle 1. Furthermore, FIG. 10 illustrates surround-view image 520 generated on the basis of these images. In this case, control unit 60 may determine, as the segment serving as the multiple-exposure region, left segment 501L, lower left segment 501LD, upper left segment 501LU, right segment 501R, lower right segment 501RD, and upper right segment 501RU in lower left image 500L. Similarly, for lower right image 500R, control unit 60 may determine segments 502L, 502LD, 502LU, 502R, 502RD, and 502 RU as the segment serving as the multiple-exposure region. Furthermore, control unit 60 may determine, as the segment serving as the multiple-exposure region, left segment 503L, lower left segment 503LD, right segment 503R, and lower right segment 503RD in lower front image 500U. Moreover, control unit 60 may determine, as the segment serving as the multiple-exposure region, upper left segment 504LU and upper right segment 504RU in lower rear image 500D.

An example of active sensor 16 is a time of flight (TOF) sensor. On the basis of a time difference (or a phase difference) between the transmission timing of emitted waves and the reception timing of reflected waves resulting from the emitted waves being reflected by an object, the TOF sensor measures the distance between the object and the TOF sensor. Therefore, the distance between vehicle 1 and nearby vehicle 302 in the example in FIG. 10 may be measured using the TOF sensor. Note that the configuration for measuring the distance may be implemented by replacing the light reception by the TOF sensor by direct light reception by image sensor 30. Furthermore, image generation device 32 (camera system) according to the present disclosure is applicable to a stereo camera.

<Additional Remarks>

Figure 11:
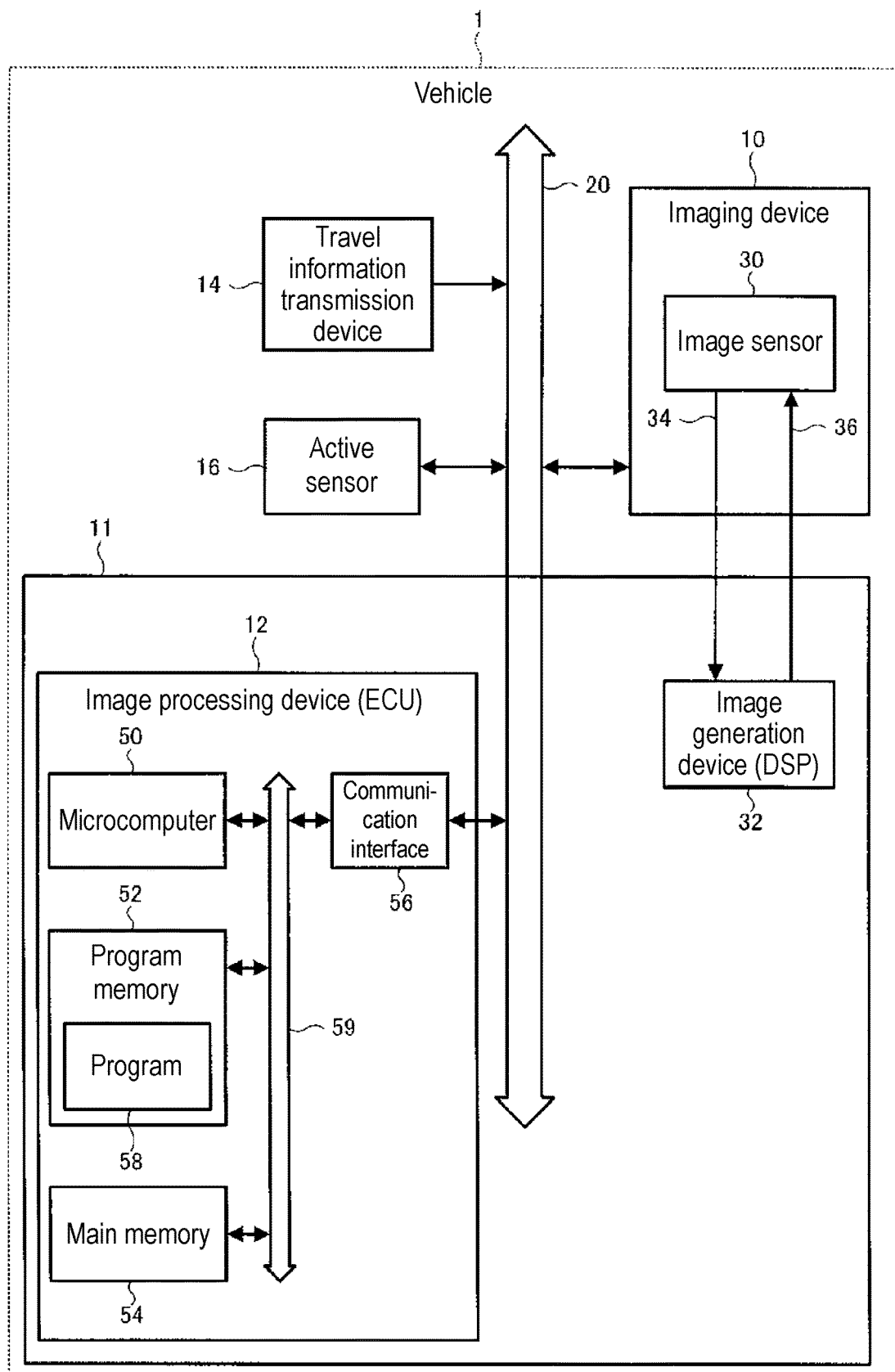
FIG. 11 is a diagram illustrating a variation of hardware configurations of an image generation device and an image processing device according to the present disclosure.

FIG. 11 is a diagram illustrating a variation of hardware configurations of the image generation device and the image processing device according to the present disclosure.

As illustrated in the example in FIG. 11, image generation device (DSP) 32 may be disposed outside of image device 10. Furthermore, image generation device (DSP) 32 and image processing device (ECU) 12 may constitute a single device (chip). The above-described exemplary embodiment may be implemented using image processing system 11 including image generation device (DSP) 32 and image processing device (ECU 12). Furthermore, control unit 60 in image generation device 32 and each element in image processing device 12 may each be implemented using a computer program. The computer program may be stored in a distributed medium such as a digital versatile disc (DVD) and provided, or may be stored in a server device on a network so as to be downloadable through the network.

<Note>

Each of the above exemplary embodiment and variation is merely an example of an implementation embodiment of the present disclosure and should not give the technical scope of the present disclosure a limited interpretation. This means that the present disclosure can be implemented in various forms without departing from the essence or the major features of the present disclosure.

INDUSTRIAL APPLICABILITY

The image generation device, the image generation method, the program, and the recording medium according to the present disclosure, in which an image of a high-speed moving object can be appropriately captured, are favorably used for an imaging device, a device mounted on a moving body, or the like.

REFERENCE MARKS IN THE DRAWINGS 1 host vehicle (vehicle, moving body)
10 imaging device
11 image processing system
12 image processing device
14 travel information transmission device
16 active sensor
20 network
30 image sensor
32 image generation device
34 transmission path
36 transmission path
50 microcomputer
52 program memory
54 main memory
56 communication interface
58 program
59 internal bus
60 control unit
62 first reception unit
70 second reception unit
72 image processing unit
74 object detection unit
76 sensor control unit
90 pixel
100 travel information
120 compressed multiple-exposure image data
140 image format information
200 segment
210 sensor control command
300 millimeter wave
302 nearby vehicle (a nearby moving body)
304 nearby vehicle (a nearby moving body)
306 nearby vehicle (a nearby moving body)
400L left image
400R right image
500D lower rear image
500L lower left image
500R lower right image
500U lower front image
520 surround-view image

The invention claimed is:

1. An image generation device comprising:
a receiver which receives travel information about a travel state of a moving body; and
a controller which sets, based on the travel information received by receiver, a multiple-exposure region in an imaging region obtained by imaging a region in front of the moving body by an image sensor, and generates image data in which the multiple-exposure region in said imaging region is formed through a multiple exposure and a region other than the multiple-exposure region is not formed through the multiple exposure, the image sensor being mounted on the moving body and performing the multiple exposure,
wherein the multiple-exposure region in said imaging region includes an image indicating the trajectory of movement of an object existing around the moving body.

2. The image generation device according to claim 1, wherein:
the image sensor includes a plurality of pixels each belonging to a corresponding one of a plurality of segments that are predetermined and obtained by dividing a region of an image captured by the image sensor; and
the controller determines at least one of the plurality of segments as the multiple exposure region based on the travel information.

3. The image generation device according to claim 2, wherein:
the controller determines, as the multiple-exposure region, a segment including a pixel that receives light from a side with respect to a traveling direction of the moving body.

4. The image generation device according to claim 3, wherein:
the controller determines from the travel information whether or not the moving body is traveling straight, and when the controller determines that the moving body is traveling straight, the controller excludes, from the segment to be determined as the multiple-exposure region, a segment including a pixel that receives at least light from straight ahead.

5. The image generation device according to claim 3, wherein: the controller determines from the travel information whether or not the moving body is steering through a turn, and when the controller determines that the moving body is steering through a turn, the controller excludes, from the segment to be determined as the multiple-exposure region, a segment including a pixel that receives at least light from a steering direction of the moving body.

6. The image generation device according to claim 3, wherein:
the side with respect to the traveling direction of the moving body is a vicinity of a travel path of the moving body.

7. The image generation device according to claim 3, wherein:
the side with respect to the traveling direction of the moving body includes at least a traffic lane adjacent to a traffic lane in which the moving body is traveling.

8. The image generation device according to claim 1, wherein:
the travel information includes at least one of a steering angle of the moving body, an angular velocity around a pitch axis of the moving body, and a slope angle ahead of a traveling spot of the moving body.

9. An image generation method comprising:
receiving travel information about a travel state of a moving body;
setting, based on the travel information received in the receiving, a multiple-exposure region in an imaging region obtained by imaging a region in front of the moving body by an image sensor which is mounted on the moving body and performs a multiple exposure; and
generating image data in which the multiple-exposure region in said imaging region is formed through the multiple exposure and a region other than the multiple-exposure region is not formed through the multiple exposure,
wherein the multiple-exposure region in said imaging region includes an image indicating the trajectory of movement of an object existing around the moving body.

10. A non-transitory recording medium having a program recorded thereon which causes a computer to execute:
receiving travel information about a travel state of a moving body;
setting, based on the travel information received in the receiving, a multiple-exposure region in an imaging region obtained by imaging a region in front of the moving body by an image sensor which is mounted on the moving body and performs a multiple exposure; and
generating image data in which the multiple-exposure region in said imaging region is formed through the multiple exposure and a region other than the multiple-exposure region is not formed through the multiple exposure,
wherein the multiple-exposure region in said imaging region includes an image indicating the trajectory of movement of an object existing around the moving body.

11. An image processing system comprising:
an image generation device including:
a receiver which receives travel information about a travel state of a moving body; and
a controller which sets, based on the travel information received by the receiver, a multiple-exposure region in an imaging region obtained by imaging a region in front of the moving body by an image sensor, and generates image data in which the multiple exposure region in said imaging region is formed through a multiple exposure and a region other than the multiple-exposure region is not formed through the multiple exposure, the image sensor being mounted on the moving body and performing the multiple exposure; and an image processor which converts a resolution of the image data,
wherein the multiple-exposure region in said imaging region includes an image indicating the trajectory of movement of an object existing around the moving body.

12. The image processing system according to claim 11, wherein:
the image processor is connected to an active sensor so as to be capable of communicating with the active sensor, and the active sensor detects a predetermined object near the moving body based on a return wave resulting from a predetermined wave, the predetermined wave being emitted from the active sensor and returning to the active sensor as the return wave; and
when the image processor detects the predetermined object in the image data having a converted resolution, the image processor controls the active sensor based on a detection result.

13. The image processing system according to claim 11, wherein: the controller controls the image sensor based on the multiple-exposure region that has been set.

14. The image processing system according to claim 11, wherein:
the image sensor includes a plurality of pixels each belonging to a corresponding one of a plurality of segments that are predetermined and obtained by dividing a region of an image captured by the image sensor; and
the controller determines at least one of the plurality of segments as the multiple exposure region based on the travel information.

15. The image processing system according to claim 14, wherein:
the controller further generates image format information of the image data; and
the image format information includes at least a resolution of an image obtained from the image sensor, the resolution of the image data, a total number of the plurality of segments, and a resolution of each of the plurality of segments.

16. The image processing system according to claim 15, wherein:
the image generation device transmits the image format information to a transmission path in a vertical blanking period for the image data.

17. The image processing system according to claim 11, wherein:
the travel information includes at least one of a steering angle of the moving body, an angular velocity around a pitch axis of the moving body, and a slope angle ahead of a traveling spot of the moving body.

* * * * *